(12) United States Patent
Wei

(10) Patent No.: US 10,642,900 B2
(45) Date of Patent: May 5, 2020

(54) METHOD AND APPARATUS FOR DISPLAYING SEARCH RESULT BASED ON DEEP QUESTION AND ANSWER

(71) Applicant: BEIJING BAIDU NETCOM SCIENCE AND TECHNOLOGY CO., LTD., Beijing (CN)

(72) Inventor: Haojie Wei, Beijing (CN)

(73) Assignee: BEIJING BAIDUE NETCOM SCIENCE AND TECHNOLOGY CO., LTD., Beijing (CN)

( * ) Notice: Subject to any disclaimer, the term of this patent is extended or adjusted under 35 U.S.C. 154(b) by 218 days.

(21) Appl. No.: 15/812,204

(22) Filed: Nov. 14, 2017

(65) Prior Publication Data
US 2018/0181677 A1    Jun. 28, 2018

(30) Foreign Application Priority Data

Dec. 27, 2016 (CN) .......................... 2016 1 1225192

(51) Int. Cl.
*G06F 16/9535* (2019.01)
*G06F 16/9032* (2019.01)
*G06F 16/34* (2019.01)

(52) U.S. Cl.
CPC ...... *G06F 16/90328* (2019.01); *G06F 16/345* (2019.01); *G06F 16/9535* (2019.01)

(58) Field of Classification Search
CPC .............. G06F 16/345; G06F 16/9535; G06F 16/90328; G06F 16/248; G06F 16/3322; G06F 16/24578; G06F 16/738; G06F 16/951
See application file for complete search history.

(56) References Cited

U.S. PATENT DOCUMENTS

| 10,242,049 | B2 * | 3/2019 | Ma ..................... G06F 16/24578 |
| 2007/0061229 | A1 * | 3/2007 | Ramer ............... G06O 30/0247 705/35 |
| 2007/0061301 | A1 * | 3/2007 | Ramer ............... G06Q 30/0247 |
| 2007/0061328 | A1 * | 3/2007 | Ramer ............... G06Q 30/0267 |
| 2007/0061331 | A1 * | 3/2007 | Ramer ................... G06Q 30/02 |
| 2007/0061333 | A1 * | 3/2007 | Ramer ............... G06F 16/9535 |
| 2007/0061363 | A1 * | 3/2007 | Ramer .................. G06Q 30/02 |
| 2008/0215623 | A1 * | 9/2008 | Ramer .................. G06Q 30/02 |
| 2008/0243819 | A1 * | 10/2008 | Sareen ................. G06F 16/951 |

(Continued)

FOREIGN PATENT DOCUMENTS

| CN | 103914543 | | 7/2014 | |
| CN | 104102721 | A * | 10/2014 | ........... G06F 16/951 |

OTHER PUBLICATIONS

SIPO, First Office Action for CN Application No. 201611225192.1, dated Aug. 1, 2019.

*Primary Examiner* — Cheyne D Ly
(74) *Attorney, Agent, or Firm* — Hodgson Russ LLP

(57) ABSTRACT

The present disclosure provides a method and an apparatus for displaying a search result based on deep question and answer. The method includes: receiving a query, in which the query is an entity recommendation query; acquiring aggregation results corresponding to the query, in which the aggregation results include entity answers and related information thereof, and the aggregation results are acquired by aggregating webpage texts comprising the entity answers respectively; and displaying the aggregation results.

15 Claims, 3 Drawing Sheets

(56) References Cited

U.S. PATENT DOCUMENTS

| | | | |
|---|---|---|---|
| 2008/0270356 A1* | 10/2008 | Anderson | G06F 16/951 |
| 2010/0082658 A1* | 4/2010 | Athsani | G06F 16/33 707/767 |
| 2011/0072033 A1* | 3/2011 | White | G06F 16/3322 707/768 |
| 2014/0330821 A1* | 11/2014 | Tullis | G06F 16/2425 707/728 |

* cited by examiner

METHOD AND APPARATUS FOR DISPLAYING SEARCH RESULT BASED ON DEEP QUESTION AND ANSWER

CROSS-REFERENCE TO RELATED APPLICATION

The present application is based upon and claims priority to Chinese Patent Application No. 201611225192.1, filed on Dec. 27, 2016, the entire content of which is incorporated herein by reference.

FIELD

The present disclosure relates to an internet technology field, and more particularly to a method and an apparatus for displaying a search result based on deep question and answer.

BACKGROUND

Deep question and answer is technology for understanding human's language, intelligent identifying meanings of a question, and extracting an answer to the question from massive internet data.

In related arts, entity answers of an entity recommendation query provided by a search engine may be distributed in a plurality of different webpages. The user may know advantages and disadvantages of the entity answers only by browsing many webpages or even by page turning or query changing, so as to make a decision. In this way, search efficiency may be low and the user experience may be poor.

SUMMARY

Embodiments of the present disclosure seek to solve at least one of the problems existing in the related art to at least some extent.

Accordingly, a first objective of the present disclosure is to provide a method for displaying a search result based on deep question and answer. The method may improve the search efficiency and the user experience.

A second objective of the present disclosure is to provide an apparatus for displaying a search result based on deep question and answer.

In order to achieve the above objectives, embodiments of a first aspect of the present disclosure provide a method for displaying a search result based on deep question and answer. The method includes: receiving a query, in which the query is an entity recommendation query; acquiring aggregation results corresponding to the query, in which the aggregation results include entity answers and related information thereof, and the aggregation results are acquired by aggregating webpage texts including the entity answers respectively; and displaying the aggregation results.

In order to achieve the above objectives, embodiments of a second aspect of the present disclosure provide an apparatus for displaying a search result based on deep question and answer. The apparatus includes: a receiving module, configured to receive a query, in which the query is an entity recommendation query; an acquiring module, configured to acquire aggregation results corresponding to the query, in which the aggregation results include entity answers and related information thereof, and the aggregation results are acquired by aggregating webpage texts including the entity answers respectively; and a displaying module, configured to display the aggregation results.

Embodiments of the present disclosure also provide a device, including: one or more processors; a memory for storing one or more programs; when the one or more programs are executed by the one or more processors, the one or more processors are configured to execute the method according to any of embodiments of the first aspect of the present disclosure.

Embodiments of the present disclosure also provide a non-transitory computer readable storage medium for storing one or more application programs, when the one or more application programs are executed by one or more processors of a device, the one or more processors are configured to execute the method according to any of the embodiments of the first aspect of the present disclosure.

Embodiments of the present disclosure also provide a computer program product that, when executed by one or more processors of a device, causes the one or more processors to execute the method according to any of the embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
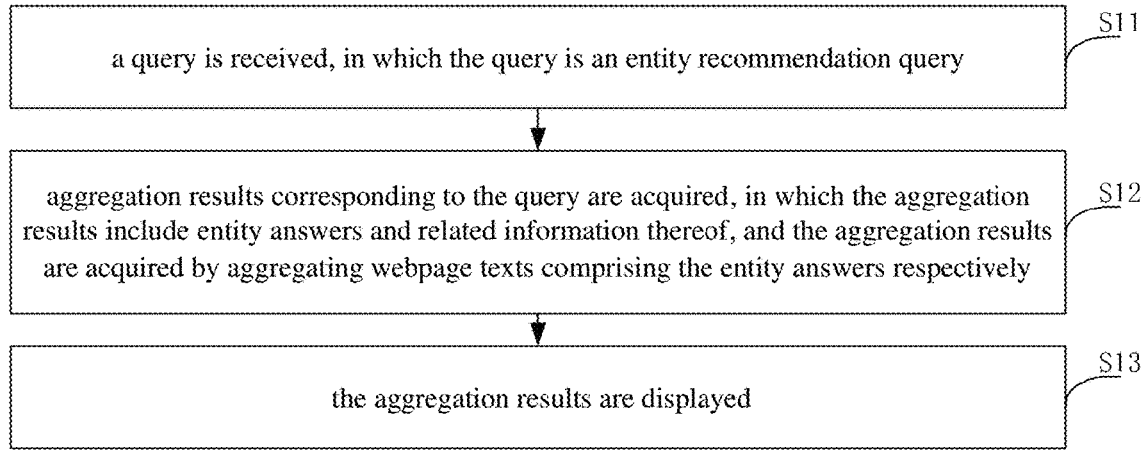
FIG. 1 is a flow chart of a method for displaying a search result based on deep question and answer according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

FIG. 1 is a flow chart of a method for displaying a search result based on deep question and answer according to an embodiment of the present disclosure.

As shown in FIG. 1, the method includes the following acts.

In block S11, a query is received, in which the query is an entity recommendation query.

For example, the query in a form of speech or text may be input by a user in a client, and the client may send the query input by the user to a search engine thereafter, such that the search engine may receive the query sent by the client.

It may be judged whether the query is an entity recommendation query after the search engine receives the query sent by the client. If yes, following procedures may be executed; if no, common search procedures may be executed.

The entity recommendation query is a query for acquiring entity answers. For example, "what kinds of cars costing 100,000 RMB are recommended" is an entity recommendation query.

Specifically, methods for determining whether a query is an entity recommendation query will be described below.

In block S12, aggregation results corresponding to the query are acquired, in which the aggregation results include entity answers and related information thereof, and the aggregation results are acquired by aggregating webpage texts including the entity answers respectively.

The search engine may acquire the webpages corresponding to the query after the query is determined as an entity recommendation query, and then the webpages may be processed so as to acquire the aggregation results.

Specific content of acquiring the aggregation results will be described below.

In block S13, the aggregation results are displayed.

The search engine may send the aggregation results to the client after the aggregation results are acquired, such that the aggregation results may be displayed for the user by the client.

Figure 2:
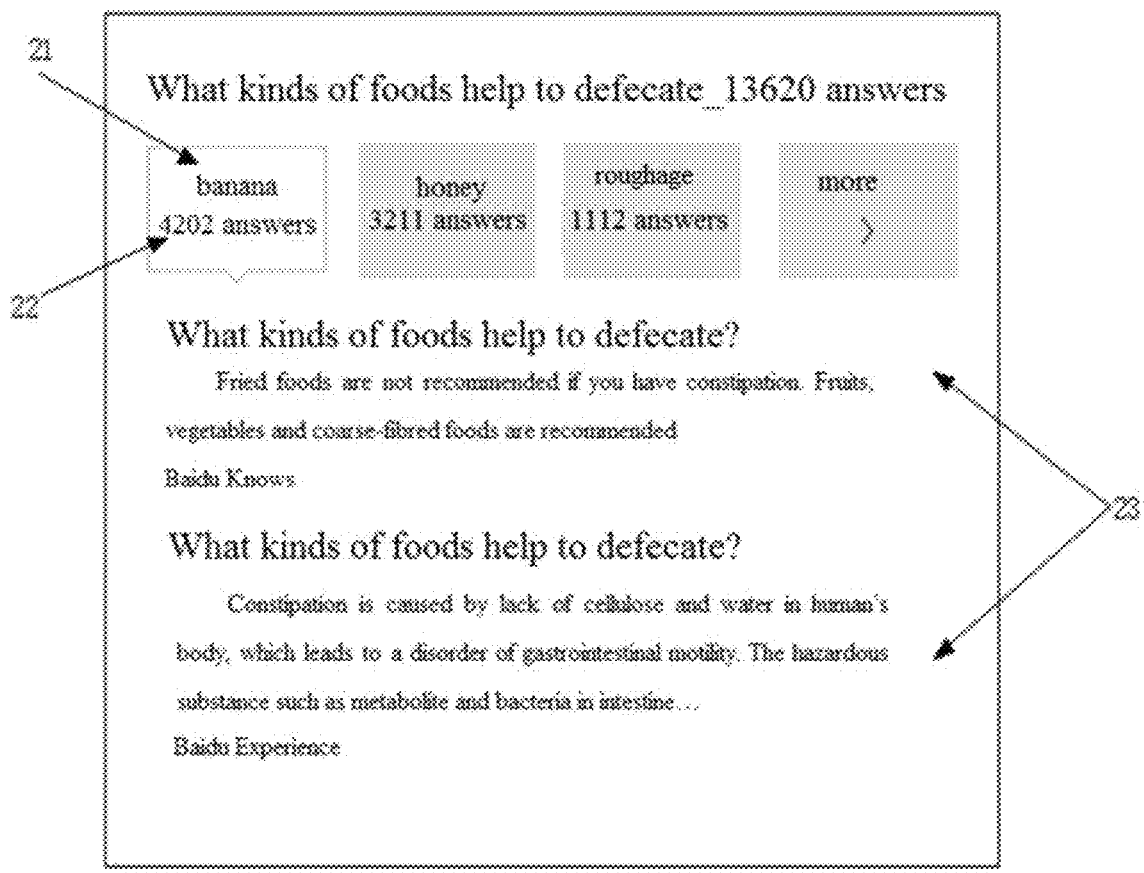
FIG. 2 is a schematic diagram of a displaying effect of search results according to an embodiment of the present disclosure.

FIG. 2 is a schematic diagram of a displaying effect of search results. As shown in FIG. 2, the aggregation results corresponding to the query may be acquired by the search engine after the query is input by the user. The search engine may send the aggregation results to the client thereafter and the aggregation results may be displayed by the client. Referring to FIG. 2, the client may display the aggregation results to the user. The aggregation results may include entity answers 21 such as "banana", "honey", "roughage" etc., and the aggregation results may include related information of the entity answers. The related information may include statistical information 22 (for example, a supporting number of the each of the entity answers, such as 4202 answers shown in FIG. 2) corresponding respectively to the entity answers, and the related information may also include recommendation reasons 23 corresponding respectively to the entity answers.

As shown in FIG. 2, two main parts including the entities and the recommendation reasons are displayed. The entity answers and supporting numbers are displayed as the entities, such that the user may aware of recommended entities corresponding to the query and popular degrees of the recommended entities quickly, which may help the user to make the decision as soon as possible. By displaying the recommendation reasons of an entity, comments and recommendation reasons for this entity given by other users are displayed for the user, such that the user may make the decision easily and faithfully.

In this embodiment, aggregation results corresponding to the query may be acquired and displayed, in which the aggregation results include entity answers and related information thereof, such that webpages may be aggregated and the entity answers included in the webpages may be extracted. Therefore, search efficiency and user experience may be improved.

Figure 3:
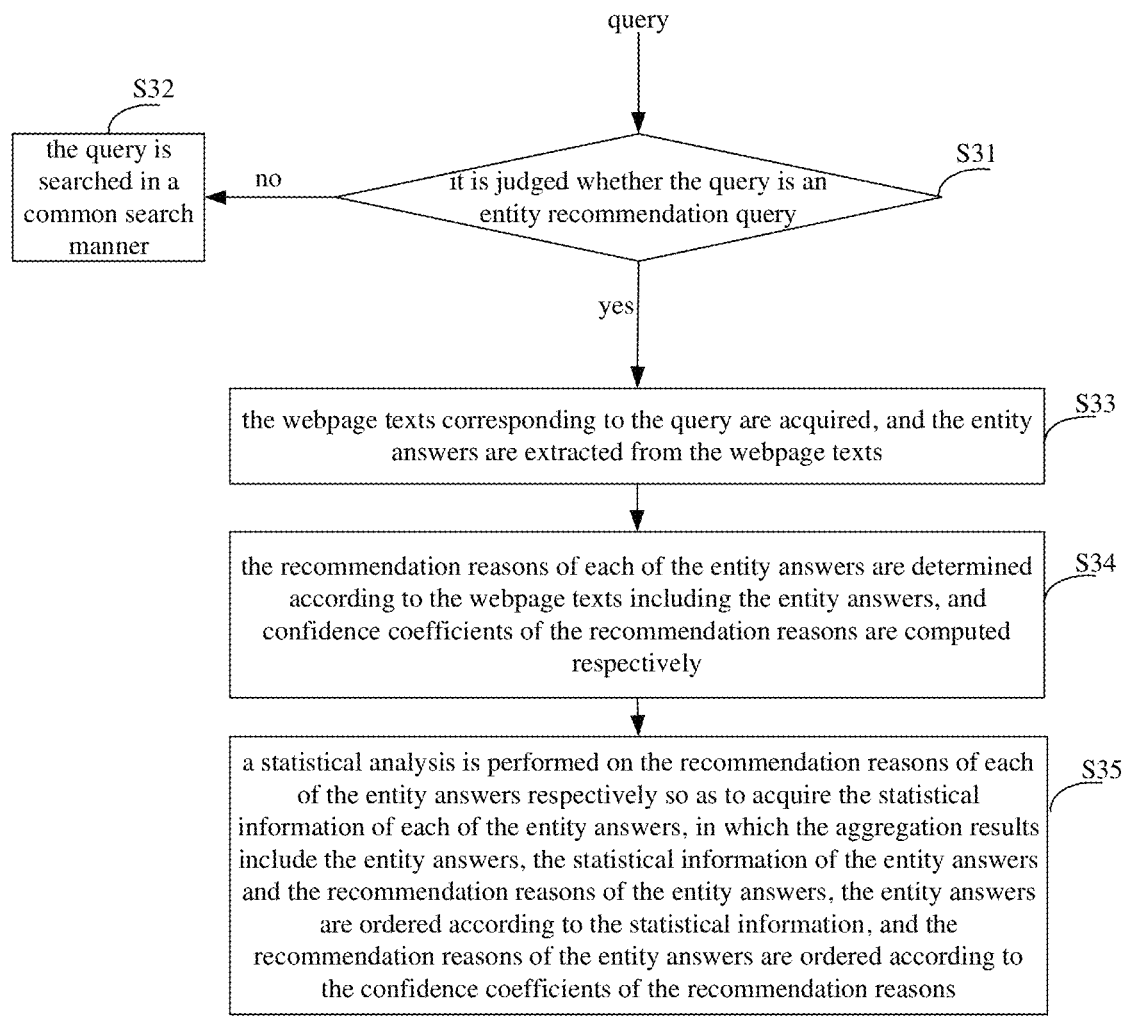
FIG. 3 is a flow chart of a method for acquiring aggregation results corresponding to a query according to an embodiment of the present disclosure.

FIG. 3 is a flow chart of a method for acquiring aggregation results corresponding to the query according to an embodiment of the present disclosure.

As shown in FIG. 3, the method of this embodiment includes the following acts.

In block S31, it is judged whether the query is an entity recommendation query. Block S33 and the subsequent acts will be executed if yes, otherwise block S32 will be executed.

The entity recommendation query is a query for acquiring entity answers. For example, "what kinds of cars costing 100,000 RMB are recommended" is an entity recommendation query.

Specifically, two ways may be used for judging whether a query is an entity recommendation query.

In a first way, it is judged whether the query is the entity recommendation query according to a matching result between the query and a preset template. For example, the preset template includes: "what kinds of [core word] are recommended", "what kinds of [core word] are recommended to buy", in which the core word is from knowledge bases such as Baidu Wikipedia. The query is the entity recommendation query if the query matches to the preset template, otherwise the query is not the entity recommendation query.

In a second way, at least one webpage corresponding to the query is acquired, and it is judged whether the query is the entity recommendation query according to a number of recommendation webpages in the at least one webpage. For example, using a common method based on the query to recall the webpages, if the number of recalled recommendation webpages exceeds a preset value or a ratio of the number of the recalled recommendation webpages to the number of the total recalled webpages exceeds a preset value, the query is judged as the entity recommendation query otherwise the query is not the entity recommendation query. The recommendation webpages may be judged according to titles of webpage texts. For example, a webpage is a recommendation webpage if the title matches to the template such as "what kinds of [core word] are recommended", "what kinds of [core word] are recommended to buy".

In block S32, the query is inquired in a common search manner.

For example, the webpages corresponding to the query may be acquired and information of the webpages may be displayed one by one on the pages of the search results.

In block S33, the webpage texts corresponding to the query are acquired, and the entity answers are extracted from the webpage texts.

For example, webpages corresponding to the query are searched for in a pre-established webpage source base and the webpage texts corresponding to the query are acquired therefrom.

Extracting the entity answers from the webpage texts may include the following acts.

Firstly, demand types of titles of the webpage texts may be identified respectively.

Specifically, dependency parsing and template matching may be used in combination of CRF sequence labeling model to identify the demand types. For example, if the title is "what kinds of domestic cars are recommended", the demand type of this title may be "car".

Then, hyponyms corresponding to each of the demand types are acquired from the webpage texts based on a list of hyponyms, and the hyponyms are regarded as candidate entity answers.

For example, if the demand type is "car", the hyponyms corresponding to "car" may be acquired in the list of hyponyms, and the hyponyms corresponding to "car" may be acquired from the webpage texts, and then the acquired hyponyms may be regarded as the candidate entity answers.

And then, the confidence coefficients of the candidate entity answers are computed respectively, and the candidate entity answers are selected according to the confidence coefficients as the entity answers extracted from the webpage texts.

For example, the confidence coefficients of the candidate entity answers are computed according to the locations and context of the candidate entity answers in the webpage texts respectively. Then, the candidate entity answers are ordered in a descending order according to the confidence coefficients, such that a preset number of candidate entity answers ranked at the top are regarded as the entity answers of the corresponding webpage texts which would be used finally.

In block S34, the recommendation reasons of each of the entity answers are determined according to the webpage texts comprising the entity answers, and confidence coefficients of the recommendation reasons are computed respectively.

Following ways may be used for determining the recommendation reasons.

In a first circumstance, a webpage text is regarded as a recommendation reason of an entity answer if a number of words in the webpage text (such as answers of users) including the entity answer is smaller than a preset value.

For example, words in a webpage text including an entity answer are few (for example, the number of words in the webpage text is smaller than 100), the whole webpage text can be regarded as a recommendation reason in order to ensure a completeness and a readability of the recommendation reason.

In a second circumstance, a list portion including an entity answer is regarded as a recommendation reason of the entity answer if a webpage text including the entity answer is a list text including the list portion.

For example, a beginning position and an ending position of the list portion may be identified using a list labeling table, and the text between the beginning position of a list portion including the entity answer and the beginning position of a next list portion may be regarded as the recommendation reason.

In a third circumstance, a segmentation is performed on a webpage text and paragraphs comprising an entity answer respectively and a segmented text is regarded as a recommendation reason of the entity answer, if the webpage text including the entity answer is not a list text and a number of words in the webpage text is greater than a preset value, in which the segmented text is segmented from a sentence including the entity answer to a preset length or to a beginning of a next paragraph in a sentence by sentence manner.

Concerning specific methods for performing the segmentation, reference may be made to various related arts, which will not be described in detail herein.

As described above, the recommendation reasons may be extracted from the webpage texts.

The confidence coefficients of the recommendation reasons may be computed using following methods after the recommendation reasons are extracted.

A plurality of feature values of each of the recommendation reasons are computed, the plurality of feature values of each of the recommendation reasons are weighted according to weights thereof, and the plurality of feature values weighted of each of the recommendation reasons are added respectively, so as to acquire the confidence coefficients of the recommendation reasons.

The plurality of feature values of a recommendation reason include: a similarity between the recommendation reason and the query, a number of positive terms included in the recommendation reason, a number of entity type properties included in the recommendation reason, an answer level of a user, and a relevancy between a title of a webpage text including the recommendation reason and the query.

Specifically, the feature values are described as follows.

The similarity between the recommendation reason and the query may be a length of a longest common subsequence of the recommendation reason and the query.

The number of positive terms included in the recommendation reason: a positive term represents a commendatory term describing the entity. In most cases, the positive terms are adjectives such as "famous", "durable", "excellent" etc. Specifically, the recommendation reason may be matched to a list of positive terms so as to acquire the number of the positive terms included in the recommendation reason. The list of positive terms is usually established by performing a statistical analysis on the adjectives included in the answers of the user in questioning-answering site and labeling the adjectives manually according to frequencies of the adjectives.

The number of entity type properties included in the recommendation reason may be acquired by matching the recommendation reason to a list of properties corresponding to the entity type. Each of the entity types corresponds to a list of properties. For example, the properties corresponding to the entity type "car" may include "appearance", "energy consumption", "underpan", "processing technology" etc. The list of properties corresponding to each of the entity types may be labeled by knowledge database or labeled manually.

The answer level of the user may be determined according to sources of the recommendation reason. For example, the answer level is high if the recommendation reason is from professional answers or adopted answers.

The relevancy between a title of a webpage text including the recommendation reason and the query is mainly used for judging whether the webpage corresponds to the query. Specifically, the relevancy may be computed based on the semantic similarity between the query and the title (qt) and click information of the search engine etc.

After the feature values are computed, the feature values are weighted according to the weights thereof, and the weighted feature values are added respectively, so as to acquire the confidence coefficients of the recommendation reasons. It may be represented by the following equation.

$$\text{para\_score} = \sum_{i=1}^{N} w_i f_i$$

para_score is the confidence coefficient of the recommendation reason; $f_i$ is an $i^{th}$ feature value of the recommendation reason; N is a total number of the feature values, for example, N=5 if there are five feature values; $w_i$ is a weight corresponding to the $i^{th}$ feature value, which may be set according to practical situations, and a summation of the weights corresponding to the feature values is 1, i.e., $$\sum_{i=1}^{N} w_i = 1.$$

In block S35, a statistical analysis is performed on the recommendation reasons of each of the entity answers respectively so as to acquire the statistical information of each of the entity answers, in which the aggregation results include the entity answers, the statistical information of the entity answers and the recommendation reasons of the entity answers, the entity answers are ordered according to the statistical information, and the recommendation reasons of the entity answers are ordered according to the confidence coefficients of the recommendation reasons.

For example, if one of the entity answers is "banana", the statistical analysis is performed on the recommendation reasons from all the webpage texts and corresponding to "banana" so as to acquire the statistical information. For example, the statistical analysis may be performed on the number of the recommendation reasons as the statistical information, in which the statistical information may be called as a supporting number; similarly, supporting numbers of other entity answers such as "honey" and "roughage" may be acquired. The entity answers may be ordered thereafter according to the supporting numbers. For example, "banana" may be ordered on the top position if the supporting number of banana is highest. The recommendation reasons corresponding to each of the entity answers may be ordered according to the confidence coefficients of the recommendation reasons. For example, the recommendation reason with a higher confidence coefficient may be ordered on a front position. Thus, the recommendation reasons may be ordered in a descending order according to the confidence coefficients when displaying.

As described above, the search engine may acquire the aggregation results and send the aggregation results to the client to display for the user. Thus, the user may see the aggregated and extracted entity answers and the related information, such that the search efficiency and the user experience may be improved.

Figure 4:
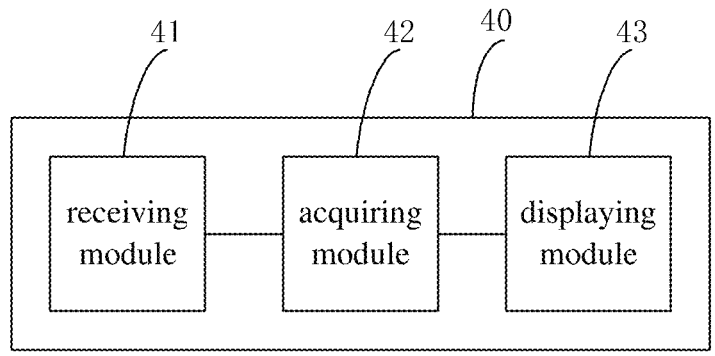
FIG. 4 is a block diagram of an apparatus for displaying a search result based on deep question and answer according to an embodiment of the present disclosure.

FIG. 4 is a block diagram of an apparatus for displaying a search result based on deep question and answer according to an embodiment of the present disclosure.

As shown in FIG. 4, the apparatus 40 includes: a receiving module 41, an acquiring module 42 and a displaying module 43.

The receiving module 41 is configured to receive a query, in which the query is an entity recommendation query.

The acquiring module 42 is configured to acquire aggregation results corresponding to the query, in which the aggregation results include entity answers and related information thereof, and the aggregation results are acquired by aggregating webpage texts comprising the entity answers respectively.

The displaying module 43 is configured to display the aggregation results.

In some embodiments, the related information includes at least one of statistical information of the entity answers and recommendation reasons of the entity answers.

Figure 5:
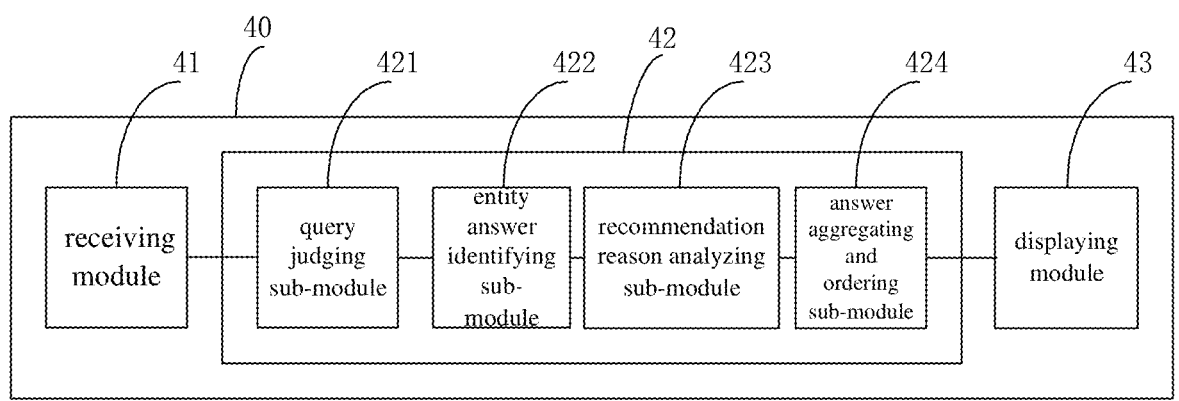
FIG. 5 is a block diagram of an apparatus for displaying a search result based on deep question and answer according to another embodiment of the present disclosure.

In some embodiments, as shown in FIG. 5, the acquiring module 42 includes a query judging sub-module 421, an entity answer identifying sub-module 422, a recommendation reason analyzing sub-module 423, an answer aggregating and ordering sub-module 424.

The query judging sub-module 421 is configured to judge whether the query is an entity recommendation query, so as to trigger the entity answer identifying sub-module 422, the recommendation reason analyzing sub-module 423, the answer aggregating and ordering sub-module 424 to work if the query is the entity recommendation query.

The entity answer identifying sub-module 422 is configured to acquire the webpage texts corresponding to the query, and to extract the entity answers from the webpage texts.

The recommendation reason analyzing sub-module 423 is configured to determine the recommendation reasons of each of the entity answers according to the webpage texts including the entity answers, and to compute confidence coefficients of the recommendation reasons respectively.

The answer aggregating and ordering sub-module 424 is configured to perform a statistical analysis on the recommendation reasons of each of the entity answers respectively so as to acquire the statistical information of each of the entity answers, in which the aggregation results include the entity answers, the statistical information of the entity answers and the recommendation reasons of the entity answers, to order the entity answers according to the statistical information, and to order the recommendation reasons of the entity answers according to the confidence coefficients of the recommendation reasons.

In some embodiments, the query judging sub-module 421 is further configured to judge whether the query is the entity recommendation query according to a matching result between the query and a preset template; or to acquire at least one webpage corresponding to the query, and to judge whether the query is the entity recommendation query according to a number of recommendation webpages in the at least one webpage.

In some embodiments, the entity answer identifying sub-module 422 is further configured to acquire the webpage texts corresponding to the query; to identify demand types of titles of the webpage texts respectively; to acquire hyponyms corresponding to each of the demand types from the webpage texts based on a list of hyponyms, in which the hyponyms are regarded as candidate entity answers; and to compute confidence coefficients of the candidate entity answers respectively, and to select the candidate entity answers according to the confidence coefficients as the entity answers extracted from the webpage texts.

In some embodiments, the recommendation reason analyzing sub-module 423 is further configured to regard a webpage text as a recommendation reason of an entity answer if a number of words in the webpage text including the entity answer is smaller than a preset value; or to regard a list portion including an entity answer as a recommendation reason of the entity answer if a webpage text including the entity answer is a list text including the list portion; or to perform a segmentation on a webpage text and paragraphs including an entity answer respectively, and to regard a segmented text as a recommendation reason of the entity answer, if the webpage text including the entity answer is not a list text, in which the segmented text is segmented from a sentence including the entity answer to a preset length or to a beginning of a next paragraph sentence by sentence.

In some embodiments, the recommendation reason analyzing sub-module 423 is configured to compute a plurality of feature values of each of the recommendation reasons, in which the plurality of feature values of a recommendation reason include: a similarity between the recommendation reason and the query, a number of positive terms included in the recommendation reason, a number of entity type properties included in the recommendation reason, an answer level of a user, and a relevancy between a title of a webpage text including the recommendation reason and the query; and to weight the plurality of feature values of each of the recommendation reasons according to weights thereof, and to add the plurality of feature values weighted of each of the recommendation reasons respectively, so as to acquire the confidence coefficients of the recommendation reasons.

It should be understood that the apparatus embodiments correspond to the method embodiments described above, concerning specific content of the apparatus embodiments, reference may be made to the method embodiments, which will not be described in detail herein.

It should be understood that the same or similar parts in the embodiments are just references to each other, and concerning the content which is not described in detail reference may be made to the same or similar parts in other embodiments.

In this embodiment, aggregation results corresponding to the query may be acquired and displayed, in which the aggregation results include entity answers and related information thereof, such that webpages may be aggregated and the entity answers included in the webpages may be extracted. Therefore, search efficiency and user experience may be improved.

The present disclosure also provides a device, including: one or more processors; a memory for storing one or more programs; when the one or more programs are executed by the one or more processors, the one or more processors are configured to: receive a query; to acquire aggregation results corresponding to the query, in which the aggregation results include entity answers and related information thereof, and the aggregation results are acquired by aggregating webpage texts comprising the entity answers respectively; and to display the aggregation results.

It should be understood that if the device is a terminal device on a user side, the device is configured to receive the query input by the user, to acquire the aggregation results corresponding to the query sent by a server, and to display the aggregation results. Alternatively, if the device is on the server side, the device is configured to receive the query sent by the client, to acquire the aggregation results corresponding to the query, to send the aggregation results to the client so as to display the aggregation results via the client.

The present disclosure also provides a non-transitory computer readable storage medium for storing one or more application programs, when the one or more application programs are executed by the one or more processors of the device, the one or more processors are configured to receive a query; to acquire aggregation results corresponding to the query, in which the aggregation results include entity answers and related information thereof, and the aggregation results are acquired by aggregating webpage texts comprising the entity answers respectively; and to display the aggregation results.

The present disclosure also provides a computer program product that, when executed by the one or more processors of a device, causes the one or more processors to execute: receive a query; to acquire aggregation results corresponding to the query, in which the aggregation results include entity answers and related information thereof, and the aggregation results are acquired by aggregating webpage texts comprising the entity answers respectively; and to display the aggregation results.

Those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for displaying a search result based on deep question and answer, comprising:
   receiving a query, wherein the query is an entity recommendation query;
   acquiring aggregation results corresponding to the query, wherein the aggregation results comprise entity answers and related information thereof, and the aggregation results are acquired by aggregating webpage texts comprising the entity answers respectively; and displaying the aggregation results;

wherein acquiring aggregation results corresponding to the query comprises:

acquiring the webpage texts corresponding to the query, and extracting the entity answers from the webpage texts;

determining the recommendation reasons of each of the entity answers according to the webpage texts comprising the entity answers, and computing confidence coefficients of the recommendation reasons respectively; and performing a statistical analysis on the recommendation reasons of each of the entity answers respectively so as to acquire the statistical information of each of the entity answers, wherein the aggregation results comprise the entity answers, the statistical information of the entity answers and the recommendation reasons of the entity answers, ordering the entity answers according to the statistical information, and ordering the recommendation reasons of the entity answers according to the confidence coefficients of the recommendation reasons.

2. The method according to claim 1, wherein the related information comprises at least one of the statistical information of the entity answers and the recommendation reasons of the entity answers.

3. The method according to claim 1, further comprising:
judging whether the query is an entity recommendation query.

4. The method according to claim 3, wherein judging whether the query is an entity recommendation query comprises:

judging whether the query is the entity recommendation query according to a matching result between the query and a preset template; or acquiring at least one webpage corresponding to the query, and judging whether the query is the entity recommendation query according to a number of recommendation webpages in the at least one webpage.

5. The method according to claim 1, wherein extracting the entity answers from the webpage texts comprises:

identifying demand types of titles of the webpage texts respectively;

acquiring hyponyms corresponding to each of the demand types from the webpage texts based on a list of hyponyms, wherein the hyponyms are regarded as candidate entity answers; and computing confidence coefficients of the candidate entity answers respectively, and selecting the candidate entity answers according to the confidence coefficients as the entity answers extracted from the webpage texts.

6. The method according to claim 1, wherein determining the recommendation reasons of each of the entity answers according to the webpage texts comprising the entity answers comprises:

regarding a webpage text as a recommendation reason of an entity answer if a number of words in the webpage text comprising the entity answer is smaller than a preset value; or regarding a list portion comprising an entity answer as a recommendation reason of the entity answer if a webpage text comprising the entity answer is a list text comprising the list portion; or performing a segmentation on a webpage text and paragraphs comprising an entity answer respectively and regarding a segmented text as a recommendation reason of the entity answer, if the webpage text comprising the entity answer is not a list text and a number of words in the webpage text is greater than a preset value, wherein the segmented text is segmented from a sentence comprising the entity answer to a preset length or to a beginning of a next paragraph in a sentence by sentence manner.

7. The method according to claim 1, wherein computing confidence coefficients of the recommendation reasons respectively comprises:

computing a plurality of feature values of each of the recommendation reasons, wherein the plurality of feature values of a recommendation reason comprise: a similarity between the recommendation reason and the query, a number of positive terms comprised in the recommendation reason, a number of entity type properties comprised in the recommendation reason, an answer level of a user, and a relevancy between a title of a webpage text comprising the recommendation reason and the query; and weighting the plurality of feature values of each of the recommendation reasons according to weights thereof, and adding the plurality of feature values weighted of each of the recommendation reasons respectively, so as to acquire the confidence coefficients of the recommendation reasons.

8. An apparatus for displaying a search result based on deep question and answer, comprising:

one or more processors;

a memory storing instructions executable by the one or more processors;

wherein the one or more processors are configured to:

receive a query, wherein the query is an entity recommendation query;

acquire aggregation results corresponding to the query, wherein the aggregation results comprise entity answers and related information thereof, and the aggregation results are acquired by aggregating webpage texts comprising the entity answers respectively; and display the aggregation results;

wherein the one or more processors are further configured to acquire aggregation results corresponding to the query by acts of:

acquiring the webpage texts corresponding to the query, and extracting the entity answers from the webpage texts;

determining the recommendation reasons of each of the entity answers according to the webpage texts comprising the entity answers, and computing confidence coefficients of the recommendation reasons respectively; and performing a statistical analysis on the recommendation reasons of each of the entity answers respectively so as to acquire the statistical information of each of the entity answers, wherein the aggregation results comprise the entity answers, the statistical information of the entity answers and the recommendation reasons of the entity answers, ordering the entity answers according to the statistical information, and ordering the recommendation reasons of the entity answers according to the confidence coefficients of the recommendation reasons.

9. The apparatus according to claim 8, wherein the related information comprises at least one of the statistical information of the entity answers and the recommendation reasons of the entity answers.

10. The apparatus according to claim 8, wherein the one or more processors are further configured to: judge whether the query is an entity recommendation query.

11. The apparatus according to claim 10, wherein the one or more processors are further configured to judge whether the query is an entity recommendation query by an act of:
   judging whether the query is the entity recommendation query according to a matching result between the query and a preset template; or
   acquiring at least one webpage corresponding to the query, and judging whether the query is the entity recommendation query according to a number of recommendation webpages in the at least one webpage.

12. The apparatus according to claim 8, wherein the one or more processors are configured to perform following acts to extract the entity answers from the webpage texts:
   acquiring the webpage texts corresponding to the query;
   identifying demand types of titles of the webpage texts respectively;
   acquiring hyponyms corresponding to each of the demand types from the webpage texts based on a list of hyponyms, wherein the hyponyms are regarded as candidate entity answers; and
   computing confidence coefficients of the candidate entity answers respectively, and selecting the candidate entity answers according to the confidence coefficients as the entity answers extracted from the webpage texts.

13. The apparatus according to claim 8, wherein the one or more processors are configured to perform following acts to determine the recommendation reasons of each of the entity answers according to the webpage texts comprising the entity answers:
   regarding a webpage text as a recommendation reason of an entity answer if a number of words in the webpage text comprising the entity answer is smaller than a preset value; or
   regarding a list portion comprising an entity answer as a recommendation reason of the entity answer if a webpage text comprising the entity answer is a list text comprising the list portion; or
   performing a segmentation on a webpage text and paragraphs comprising an entity answer respectively and regarding a segmented text as a recommendation reason of the entity answer, if the webpage text comprising the entity answer is not a list text and a number of words in the webpage text is greater than a preset value, wherein the segmented text is segmented from a sentence comprising the entity answer to a preset length or to a beginning of a next paragraph in a sentence by sentence manner.

14. The apparatus according to claim 8, wherein the one or more processors are configured to perform following acts to compute confidence coefficients of the recommendation reasons respectively:
   computing a plurality of feature values of each of the recommendation reasons, wherein the plurality of feature values of a recommendation reason comprise: a similarity between the recommendation reason and the query, a number of positive terms comprised in the recommendation reason, a number of entity type properties comprised in the recommendation reason, an answer level of a user, and a relevancy between a title of a webpage text comprising the recommendation reason and the query; and
   weighting the plurality of feature values of each of the recommendation reasons according to weights thereof, and adding the plurality of feature values weighted of each of the recommendation reasons respectively, so as to acquire the confidence coefficients of the recommendation reasons.

15. A non-transitory computer-readable storage medium having stored therein instructions that, when executed by a processor of a device, cause the processor to perform a method for displaying a search result based on deep question and answer, the method comprising:
   receiving a query, wherein the query is an entity recommendation query;
   acquiring aggregation results corresponding to the query, wherein the aggregation results comprise entity answers and related information thereof, and the aggregation results are acquired by aggregating webpage texts comprising the entity answers respectively; and
   displaying the aggregation results;
   wherein acquiring the aggregation results corresponding to the query comprises:
   acquiring the webpage texts corresponding to the query, and extracting the entity answers from the webpage texts;
   determining the recommendation reasons of each of the entity answers according to the webpage texts comprising the entity answers, and computing confidence coefficients of recommendation reasons respectively; and
   performing a statistical analysis on the recommendation reasons of each of the entity answers respectively so as to acquire statistical information of each of the entity answers, wherein the aggregation results comprise the entity answers, the statistical information of the entity answers and the recommendation reasons of the entity answers, ordering the entity answers according to the statistical information, and ordering the recommendation reasons of the entity answers according to the confidence coefficients of the recommendation reasons.

* * * * *

UNITED STATES PATENT AND TRADEMARK OFFICE
CERTIFICATE OF CORRECTION

PATENT NO. : 10,642,900 B2
APPLICATION NO. : 15/812204
DATED : May 5, 2020
INVENTOR(S) : Wei

Page 1 of 1

It is certified that error appears in the above-identified patent and that said Letters Patent is hereby corrected as shown below:

On the Title Page

Item (73), the Assignee should read:
--(73) Assignee: BEIJING BAIDU NETCOM
SCIENCE AND TECHNOLOGY
CO., LTD., Beijing (CN)--

Signed and Sealed this
Twenty-eighth Day of July, 2020

Andrei Iancu
*Director of the United States Patent and Trademark Office*